(No Model.)
M. L. ROGERS.
SULKY HARROW.
No. 542,943. Patented July 16, 1895.
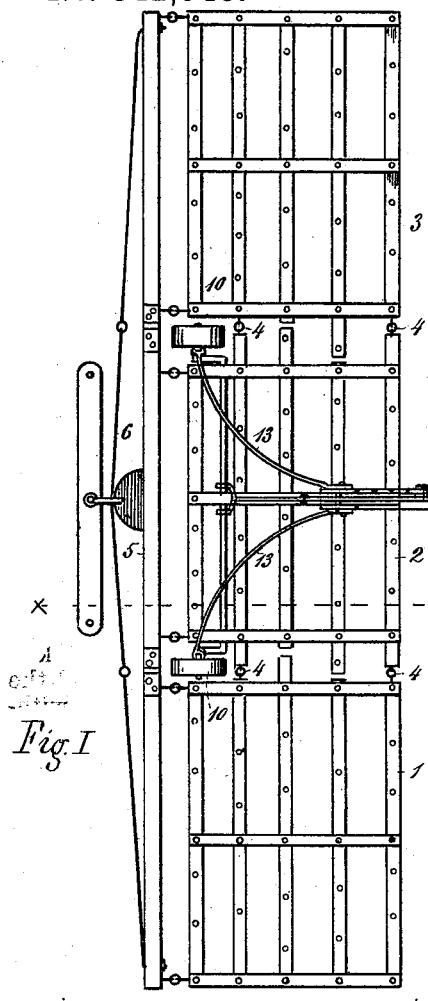
Fig. I
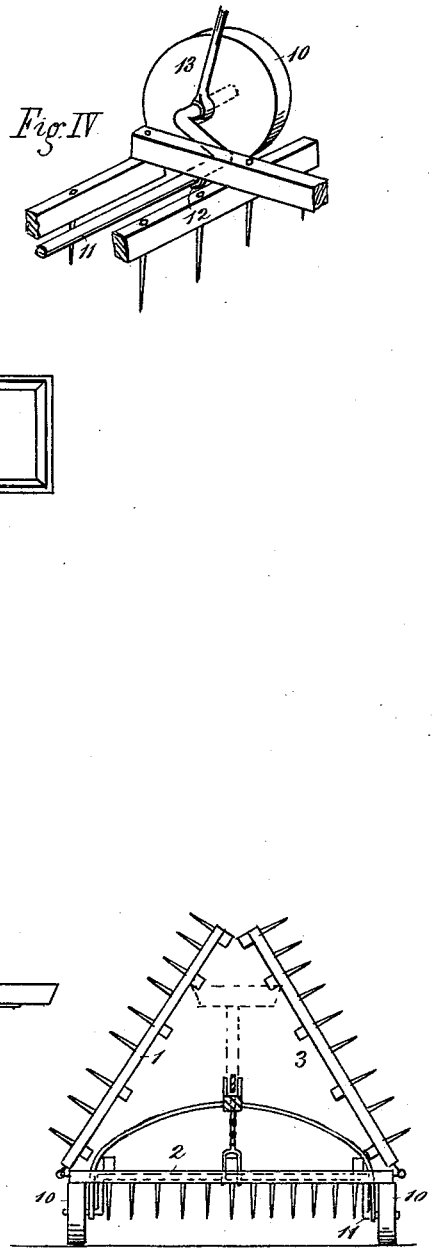
Fig. IV
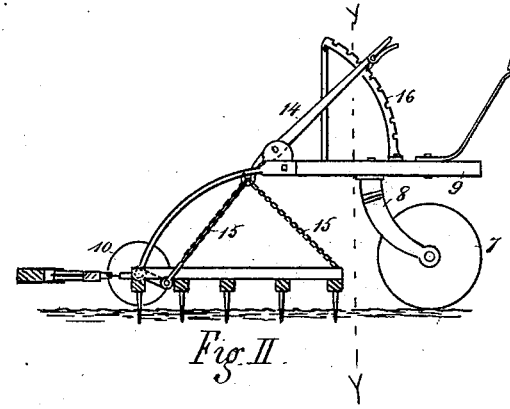
Fig. II. Fig. III.
WITNESSES:
R. S. Millar
L. M. Adams
INVENTOR,
M. L. Rogers.
BY
Bailey
ATTORNEY.

UNITED STATES PATENT OFFICE.

MERRITT L. ROGERS, OF EXETER, NEBRASKA.

SULKY-HARROW.

SPECIFICATION forming part of Letters Patent No. 542,943, dated July 16, 1895.

Application filed October 22, 1894. Serial No. 526,641. (No model.)

*To all whom it may concern:*

Be it known that I, MERRITT L. ROGERS, a citizen of the United States, residing at Exeter, in the county of Fillmore and State of Nebraska, have invented a new and useful Improvement in Sulky-Harrows, which improvement is fully set forth in the following specification and accompanying drawings, in which—

Figure I is a plan view of my improved three-wheel harrow; Fig. II, a vertical section on line $xx$ of Fig. I; Fig. III, a transverse section on line $y\,y$ in Fig. II, showing the side sections turned up and the central section elevated and resting on the wheels; and Fig. IV a detail view of one of the small wheels and its adjuncts.

The object of my invention is to provide a simple, durable, and efficient harrow composed of three frame sections flexibly united and mounted on three wheels. The peculiar construction and various advantages of the device will be understood by reference to the drawings, in which 1, 2, and 3 represent three frame sections, preferably of the same dimensions, which are provided with teeth of any desired form. The sections are united at their sides by suitable hook-and-eye connections 4. The front margins of the sections are united in the same manner to a transverse bar 5 and its stay-brace 6, each comprising three flexibly-united sections of equal length. It will be observed that important advantages are gained by this form of construction. The frame-sections and their adjuncts being independent, to a sufficient degree, each section is free to adapt itself to depressions or undulating surfaces of ground which would be skipped or very lightly touched by the implements in general use.

A caster-wheel 7, adapted to support the rider and facilitate the turning of the harrow at corners or headlands, runs in the rear of the central section and engages bearings in a yoke 8, which is rotatably attached to the under side of the beam 9. The front wheels 10 are mounted on the ends of a crank-axle 11, supported by bearings 12 beneath the frame, as shown in the drawings. Braces 13 are rearwardly attached to the beam 9 and extend divergingly forward and downward in a curve, terminating in eyes which engage the ends of the crank-shaft adjacent to the front wheels. An angle-lever 14 is mounted on the front end of the beam and carries two chains 15, one of which is attached to the center of the crank-shaft, the other to the rear bar of the central frame-section. It will be understood that if the lever be drawn backwardly in contact with the beam and locked by the detent 16 the central section of harrow will be elevated and the teeth withdrawn from the soil. The wing-sections 1 and 3, with the jointed bar 5, may then be simultaneously raised to the position shown in Fig. III. These changes are effected without detaching the team, and the harrow being thus entirely thrown upon the wheels may be conveniently hauled from place to place.

What I claim as new is—

In a sulky harrow, the combination with the three flexibly united frame sections, the beam, the yoke pivotally connected therewith, and the caster wheel, of the divergent braces, secured to said beam, the oscillatory crank shaft journaled to said braces, the wheels journaled on said shaft, the lever, the chain secured thereto and to the said shaft and the chain connected with the rear end of the central frame section and with said lever, substantially as described.

In testimony that I claim the foregoing I have hereunto set my hand, this 8th day of October, 1894, in the presence of witnesses.

MERRITT L. ROGERS.

Witnesses:
GEORGE FRANKLIN WALKER,
GEO. H. LEE.